United States Patent
Ma et al.

(10) Patent No.: US 11,240,413 B2
(45) Date of Patent: Feb. 1, 2022

(54) VOICE COIL MOTOR, CAMERA MODULE, AND ELECTRONIC DEVICE USING THE SAME

(71) Applicant: TRIPLE WIN TECHNOLOGY(SHENZHEN) CO.LTD., Shenzhen (CN)

(72) Inventors: Xiao-Mei Ma, Guangdong (CN); Shin-Wen Chen, New Taipei (TW); Long-Fei Zhang, Guangdong (CN); Kun Li, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 143 days.

(21) Appl. No.: 16/545,238

(22) Filed: Aug. 20, 2019

(65) Prior Publication Data

US 2020/0274999 A1 Aug. 27, 2020

(30) Foreign Application Priority Data

Feb. 21, 2019 (CN) .......................... 201910130575.8

(51) Int. Cl.
*H04N 5/225* (2006.01)
*H02P 7/025* (2016.01)
*G02B 7/08* (2021.01)
*H02K 41/035* (2006.01)

(52) U.S. Cl.
CPC ............. *H04N 5/2257* (2013.01); *G02B 7/08* (2013.01); *H02K 41/0354* (2013.01); *H02P 7/025* (2016.02); *H04N 5/2253* (2013.01); *H04N 5/22521* (2018.08); *G03B 2205/0069* (2013.01)

(58) Field of Classification Search
CPC .............. H04N 5/2257; H04N 5/2253; H04N 5/22521; H04N 5/2252; H04N 5/2251; H02P 7/025; G02B 7/08; G02B 7/09; G02B 7/02; H02K 41/0354; H02K 5/04; H02K 41/0356; H02K 7/14; G03B 2205/0069
See application file for complete search history.

(56) References Cited

U.S. PATENT DOCUMENTS

2013/0170055 A1* 7/2013 Yu ...................... H02K 41/0356 359/824
2020/0183124 A1* 6/2020 Lee ........................ G03B 17/12

FOREIGN PATENT DOCUMENTS

| CN | 101877509 A | 11/2010 |
|---|---|---|
| CN | 104868647 A | 8/2015 |
| CN | 204832640 U | 12/2015 |
| CN | 205336542 U | 6/2016 |
| CN | 106575025 A | 4/2017 |
| CN | 109070811 A | 12/2018 |
| CN | 208353432 U | 1/2019 |

* cited by examiner

Primary Examiner — Mekonnen D Dagnew
(74) Attorney, Agent, or Firm — ScienBiziP, P.C.

(57) ABSTRACT

A voice coil motor strongly attached to the base of a camera module comprises the base and a casing. The casing and the base are interlocked with each other. The casing is a hollow structure. The casing comprises a top surface and a side wall surrounding the top surface. The side wall and the base are engaged with each other. The side wall is extended in parts to form at least one extending leg. The extending leg extends to a side of the base away from the top surface and is bent toward the base.

16 Claims, 8 Drawing Sheets

VOICE COIL MOTOR, CAMERA MODULE, AND ELECTRONIC DEVICE USING THE SAME

FIELD

The subject matter relates to cameras, and in particular, to a voice coil motor and electronic device using the voice coil motor.

BACKGROUND

Electronic devices, such as mobile phones or tablet computers, can have camera modules. As the electronic device becomes thinner and lighter, the camera module also becomes thinner and lighter, by using smaller casings for example. However, as the casing becomes smaller, the contact area between the casing and the base also becomes smaller. When the casing and the base are bonded together using an adhesive, adhesion force between the casing and the base becomes smaller. Therefore, the casing and the base of the camera module can be easily separated.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

First Embodiment

Figure 1:
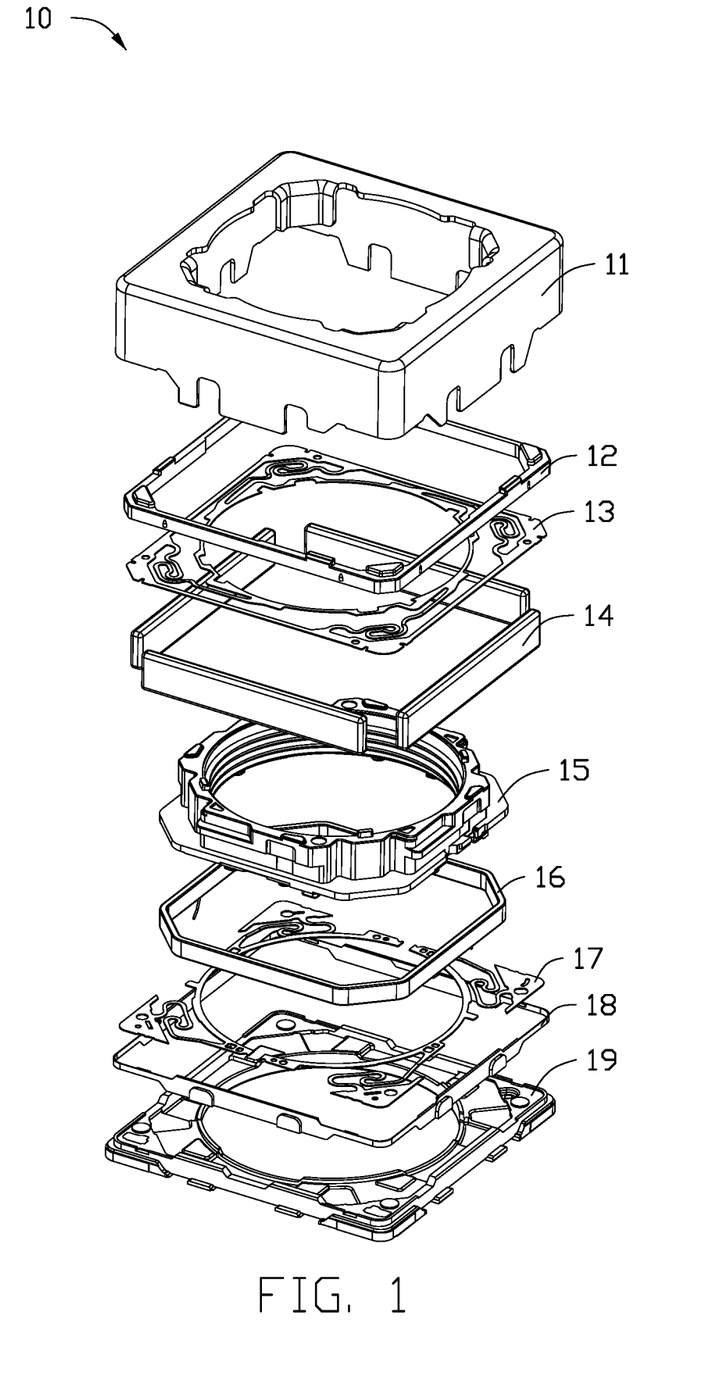
FIG. 1 is an exploded view of a voice coil motor according to a first embodiment of the present disclosure.

FIG. 1 shows a first embodiment of a voice coil motor 10 including a casing 11, an upper pressing plate 12, an upper elastic plate 13, a magnet 14, a lens holder 15, a coil 16, a lower elastic plate 17, an auxiliary frame 18, and a base 19. The casing 11 and the base 19 are engaged together to form a receiving structure. The upper cover pressing plate 12, the upper elastic plate 13, the magnet 14, the lens holder 15, the coil 16, the lower elastic plate 17, and the auxiliary frame 18 are sequentially disposed in the receiving structure.

The lens holder 15 can receive a lens (not shown). The magnet 14 is disposed between the lens holder 15 and the casing 11. The upper elastic plate 13 and the lower elastic plate 17 are at the opposite sides of the lens holder 15. The magnet 14 and the coil 16 are fixed to the lens holder 15. When the coil 16 is energized, a magnetic field acts on the magnet 14. The lens holder 15 is repulsed relative to the lens holder 15 to achieve autofocus. The upper elastic plate 13 and the lower elastic plate 17 can drive the lens back to the lens holder 15. The upper cover pressing plate 12 is disposed between the upper elastic plate 13 and the casing 11.

Figure 2:
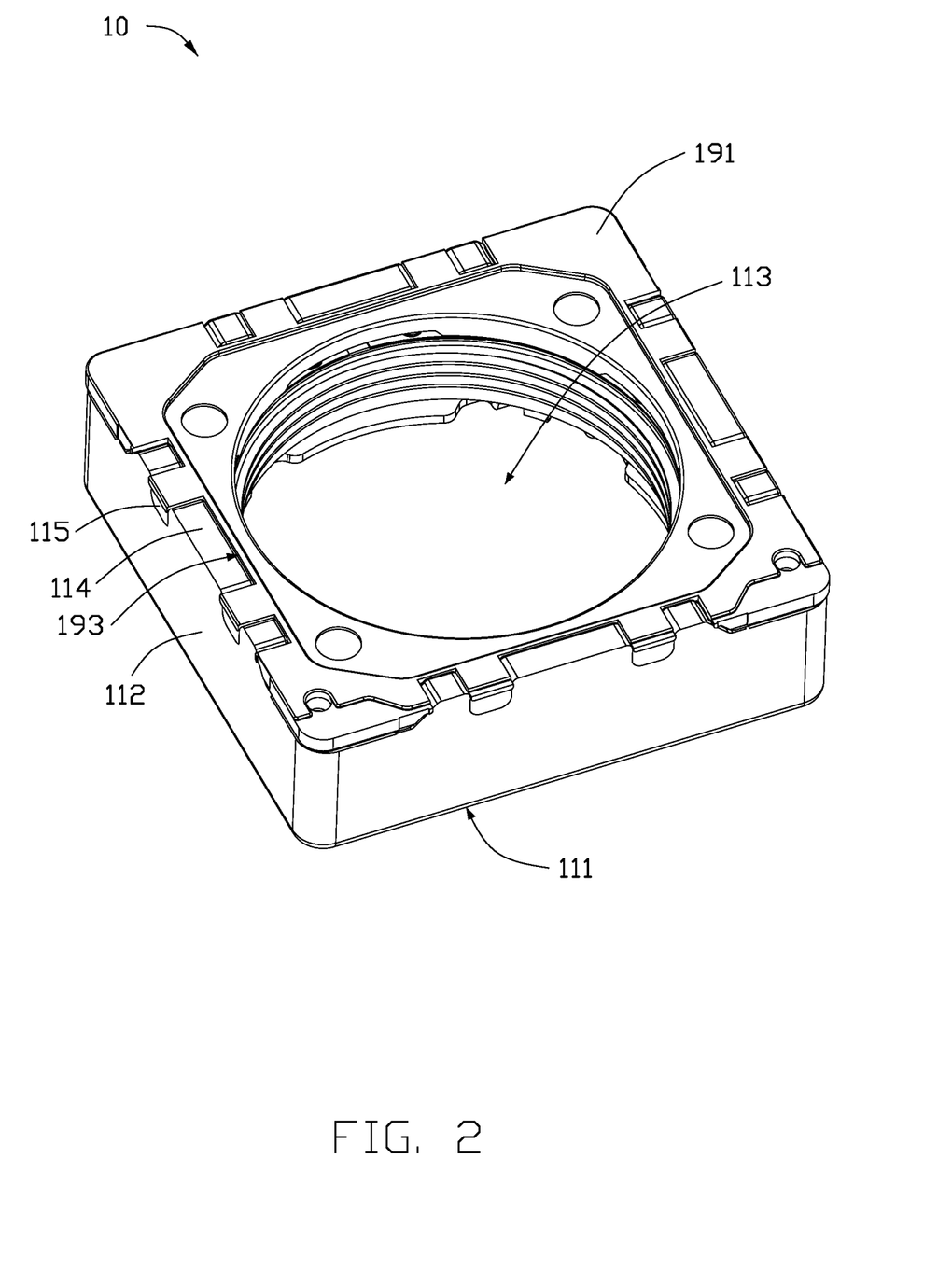
FIG. 2 is a perspective view of the voice coil motor of FIG. 1.

With reference to FIG. 2, the casing 11 has a hollow structure, and includes a top surface 111 and a number of side walls 112 around the top surface 111. The top surface 111 defines an opening 113 facing the lens.

The side wall 112 includes a plurality of adhesive injection openings 115. The adhesive injection opening 115 are defined at the edge of the side wall 112 which is away from the top surface 111. In one embodiment, the casing 11 is rectangular. There are four side walls 112. At least two adhesive injection openings 115 are defined at the edge of each side wall 112. In other embodiments, the casing 11 may be cylindrical, and the casing 11 may include only one side wall 112 surrounding the edges of the top surface 111.

Extending legs 114 extend from the edge of the side wall 112, that is adjacent to the base 19, along a direction away from the side wall 112. That is, the extending legs 114 are bent relative to the side wall 112. The ends of the extending legs 114 near the side wall 112 are spaced from the adhesive injection openings 115. In other embodiments, there is only one extension leg 114.

The base 19 includes a substrate 191. The casing 11 is engaged with the substrate 191. In one embodiment, the edges of the base 19 further defines a plurality of receiving grooves 193. The extending legs 114 are received in the receiving groove 193. The size of the receiving groove 193 is not less than the size of the extension leg 114. In other embodiments, the base 19 may further include a plurality of through holes (not shown) penetrating through the substrate 191, and the size of the through holes is larger than the size of the extending legs 114, thus the extending legs 114 can pass through the through holes. The number of the extending legs 114 is equal to the number of the through holes. The extending legs 114 are bent towards the substrate 191 through the through holes and are received in the receiving groove 193. The number of the through holes may be one or zero.

The casing 11 and the base 19 can be bonded to each other by adhesive injected into the adhesive injection openings 115. The extending leg 114 and the substrate 191 can be bonded to each other by injecting adhesive into the receiving groove 193. Thus, the casing 11 and the base 19 can be bonded by injecting adhesive into the adhesive injection openings 115 and the receiving grooves 193. The adhesive injection openings 115 and the receiving grooves 193 are located at different positions, thus can provide stronger adhesion by more than one direction to the casing 11 and the base 19. Thus, the bonding strength between the casing 11 and the base 19 can be stronger.

Second Embodiment

Figure 3:
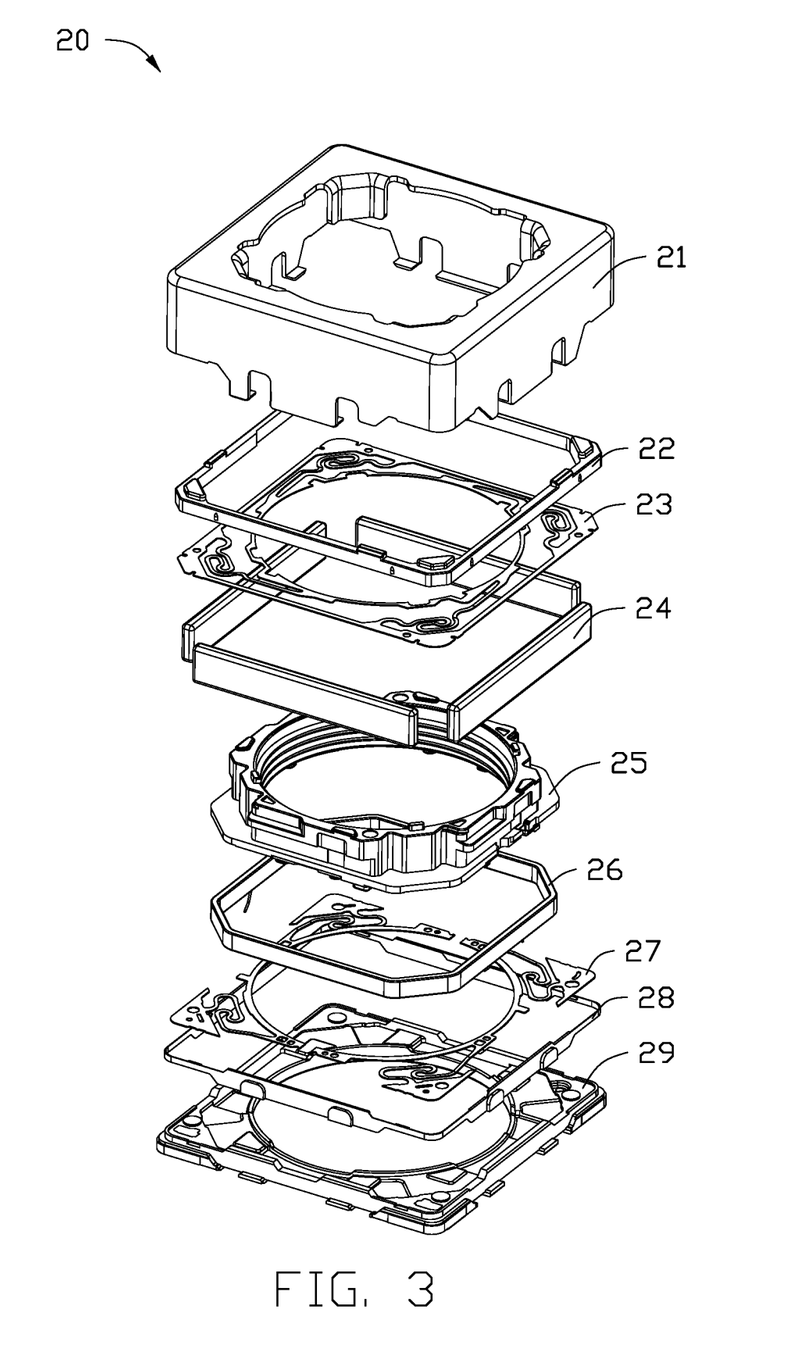
FIG. 3 is an exploded view of a voice coil motor according to a second embodiment of the present disclosure.

FIG. 3 shows a second embodiment of a voice coil motor 20 including a casing 21, an upper cover pressing plate 22, an upper elastic plate 23, a magnet 24, a lens holder 25, a coil 26, a lower elastic plate 27, an auxiliary frame 28, and a base 29. The casing 21 and the base 29 are fastened together to form a receiving structure. The upper cover pressing plate 22, the upper elastic plate 23, the magnet 24, the lens holder 25, the coil 26, the lower elastic plate 27, and the auxiliary frame 28 are sequentially disposed in the receiving structure.

The lens holder 25 can receive a lens (not shown). The magnet 24 is disposed between the lens holder 25 and the casing 21. The upper elastic plate 23 and the lower elastic plate 27 are at the opposite sides of the lens holder 25. The magnet 24 and the coil 26 are fixed to the lens holder 25. When the coil 26 is energized, the lens holder 25 is repulsed relative to the lens holder 25 to achieve autofocus. The upper elastic plate 23 and the lower elastic plate 27 can drive the lens back to the lens holder 25. The upper cover pressing plate 22 is disposed between the upper elastic plate 23 and the casing 21.

Figure 4:
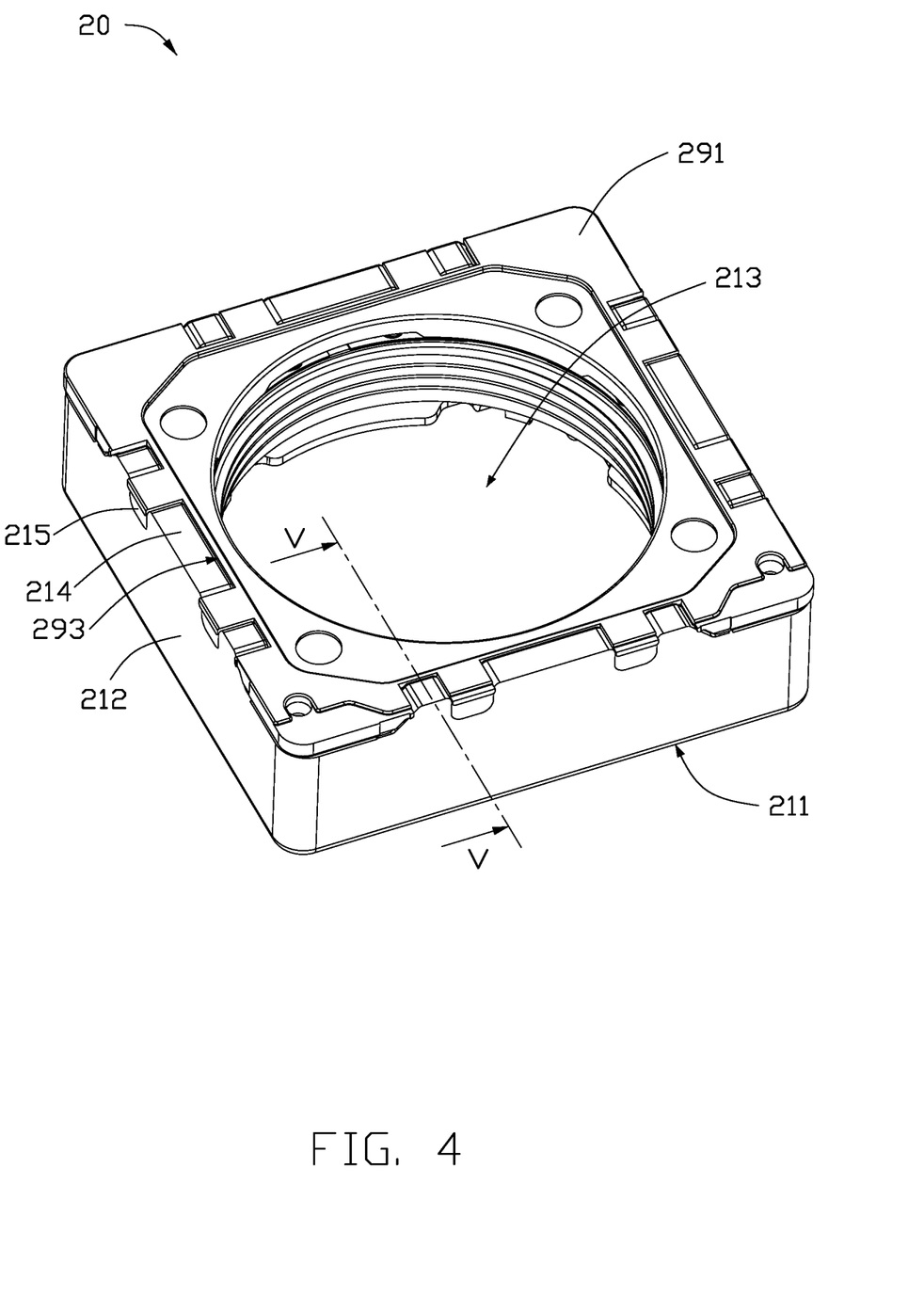
FIG. 4 is a perspective view of the voice coil motor of FIG. 3.
Figure 5:
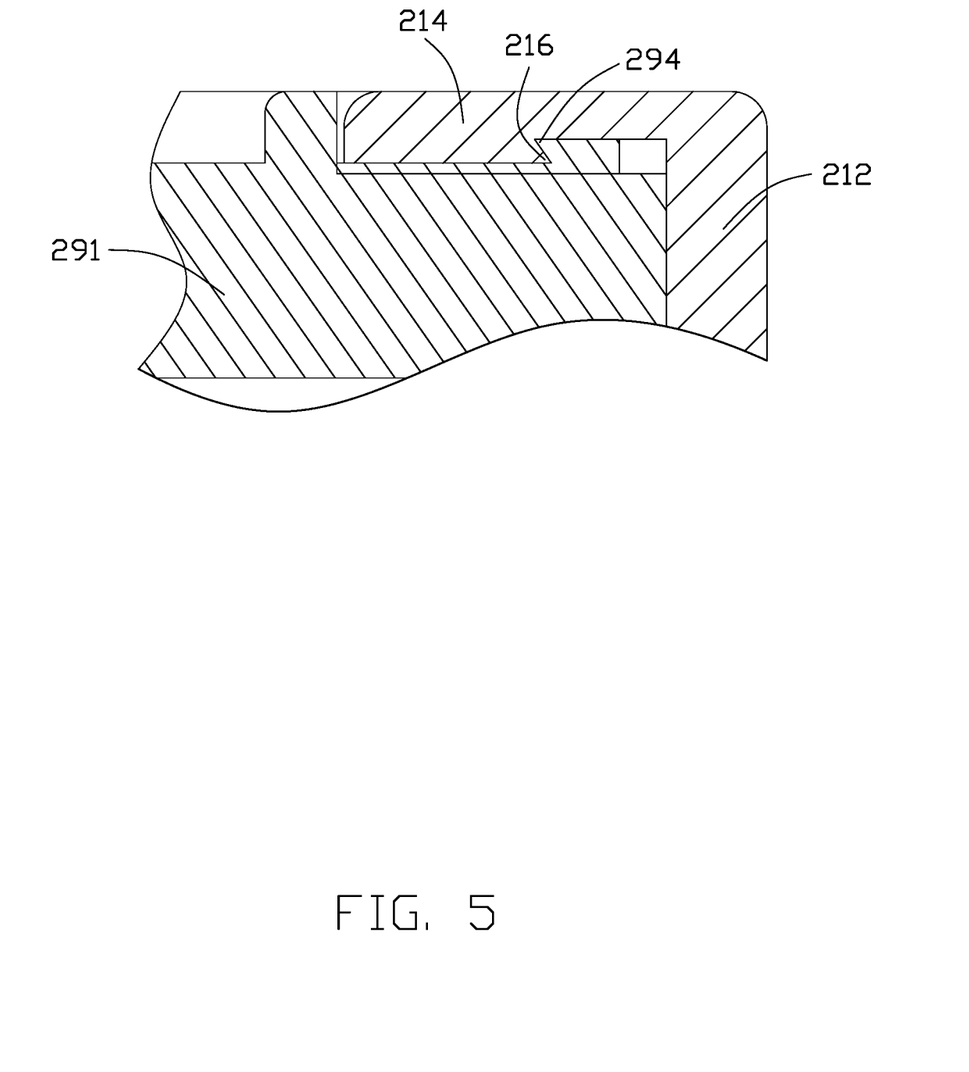
FIG. 5 is a cross-sectional view along line V-V of FIG. 4.

With reference to FIG. 4 and FIG. 5, the casing 21 has a hollow structure. The casing 21 includes a top surface 211 and a side wall 212 disposed around the top surface 211. The top surface 211 is provided with an opening 213.

The side wall 212 includes a plurality of adhesive injection openings 215. The plurality of adhesive injection opening 215 is defined at the edge of the side wall 212 which is away from the top surface 211. In one embodiment, the casing 21 is rectangular. There are four side walls 212. At least two adhesive injection openings 215 are defined at the edge of each side wall 212. In other embodiments, the casing 21 may be cylindrical, and the casing 21 may include only one side wall 212 surrounding the edges of the top surface 211.

The extending legs 214 extend from the edge of the side wall 212, that is adjacent to the base 29, along a direction away from the side wall 212. That is, the extending legs 214 are bent relative to the side wall 212. The ends of the extending legs 214 near the side wall 212 are spaced apart from the adhesive injection openings 215. In other embodiments, there is only one extension legs 214.

The base 29 includes a substrate 291. The casing 21 is engaged with the substrate 291. In one embodiment, the edges of the base 29 further defines a plurality of slots 294 and a plurality of receiving grooves 293. The extending legs 214 are received in the receiving grooves 293. The size of the receiving groove 293 is not less than the size of the extension leg 214. A latching portion 216 is disposed at an end of the extending leg 214 near to the slot 294. The slot 294 is engaged with the latching portion 216. In other embodiments, the base 29 may further includes a plurality of through holes (not shown) penetrating through the substrate 291, and the size of the through holes is larger than the size of the extending legs 214, thus the extending legs 214 can pass through the through holes. The number of the extending legs 214 is equal to the number of through holes. The extending legs 214 are bent towards the substrate 291 through the through holes and are received in the receiving grooves 293. The number of the through holes may be one or zero. The number of the grooves 294 is equal to the number of the latching portions 216.

The casing 21 and the base 29 can be bonded to each other by injecting adhesive into the adhesive injection openings 215. The extending legs 214 and the substrate 291 can be bonded to each other by injecting adhesive into the receiving grooves 293. The receiving groove 293 allow the casing 21 and the base 29 to be bonded by injecting adhesive into the adhesive injection openings 215 and the receiving grooves 293. The adhesive injection openings 215 and the receiving grooves 293 are located at different positions, thus can provide stronger adhesion in different directions to the casing 21 and the base 29. Thus, the bonding strength between the casing 21 and the base 29 can be stronger.

Third Embodiment

Figure 6:
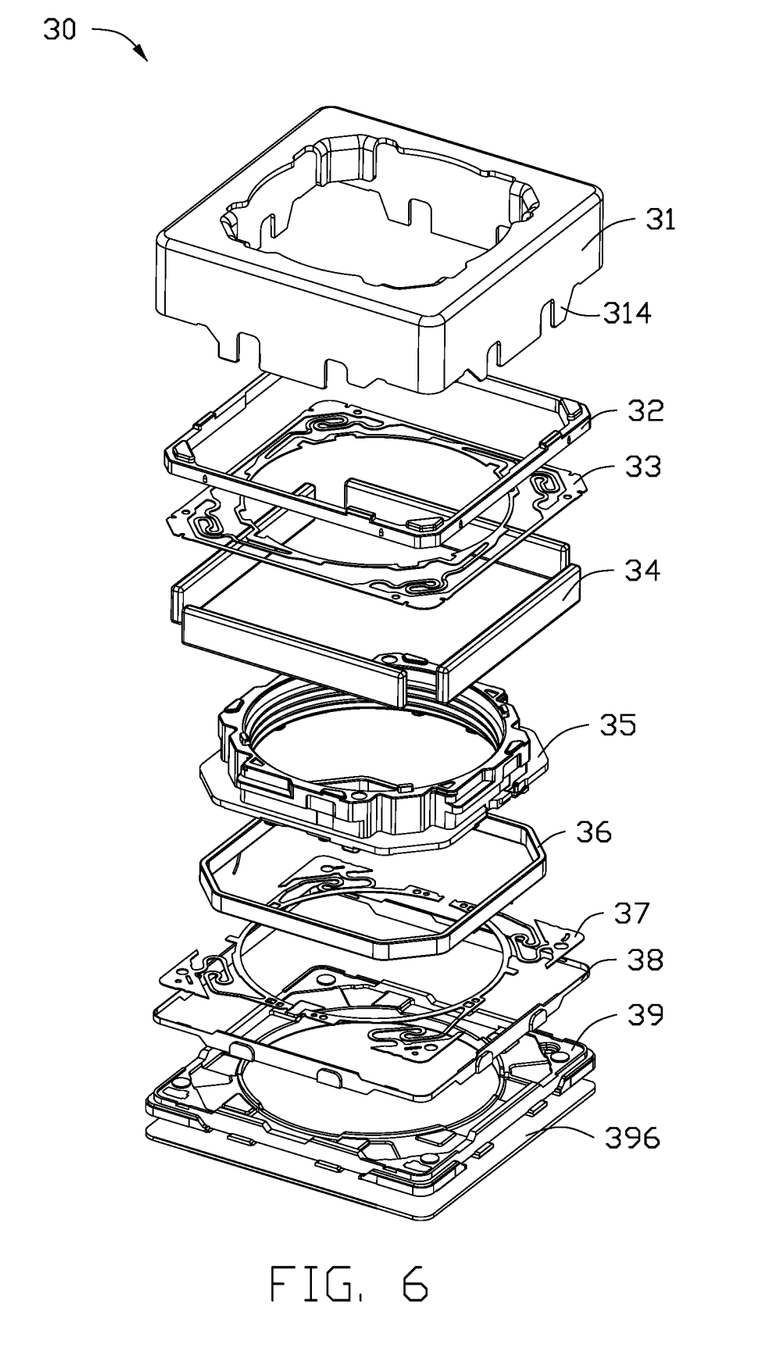
FIG. 6 is an exploded view of a voice coil motor according to a third embodiment of the present disclosure.

FIG. 6 shows a third embodiment of a voice coil motor 30 including a casing 31, an upper cover pressing plate 32, an upper elastic plate 33, a magnet 34, a lens holder 35, a coil 36, a lower elastic plate 37, an auxiliary frame 38, and a base 39. The casing 31 and the base 39 are fastened to form a receiving structure. The upper cover pressing plate 32, the upper elastic plate 33, the magnet 34, the lens holder 35, the coil 36, the lower elastic plate 37, and the auxiliary frame 38 are sequentially disposed in the receiving structure.

The lens holder 35 can receive a lens (not shown). The magnet 34 is disposed between the lens holder 35 and the casing 31. The upper elastic plate 33 and the lower elastic plate 37 are at the opposite sides of the lens holder 35. The magnet 34 and the coil 16 are fixed to the lens holder 35. When the coil 36 is energized, the lens holder 35 is repulsed relative to the lens holder 35 to achieve autofocus. The upper elastic plate 33 and the lower elastic plate 37 can drive the lens back to the lens holder 35. The upper cover pressing plate 32 is disposed between the upper elastic plate 33 and the casing 31.

Figure 7:
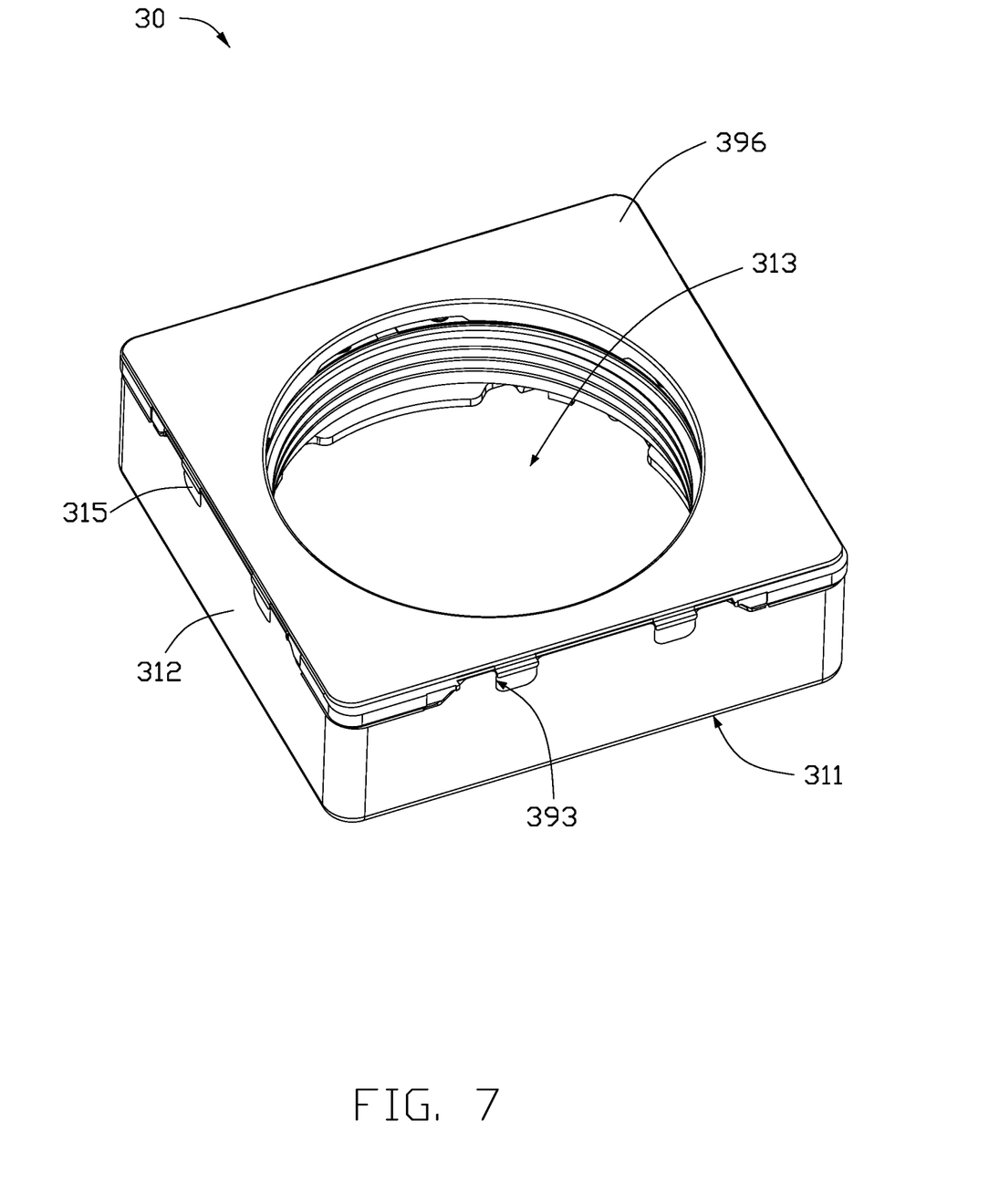
FIG. 7 is a perspective view of the voice coil motor of FIG. 6.

With reference to FIG. 7, the casing 31 has a hollow structure, and the casing 31 includes a top surface 311 and a number of side walls 312 around the top surface 311. The top surface 311 defines an opening 313 which facing the lens.

The side wall 312 includes a plurality of adhesive injection openings 315. The adhesive injection openings 315 are defined at the edge of the side wall 312 which is away from the top surface 311. In one embodiment, the casing 31 is rectangular. There four side walls 312. At least two adhesive injection openings 315 are defined at the edge of each side wall 312. In other embodiments, the casing 31 may be cylindrical, and the casing 31 may include only one side wall 312 surrounding the edges of the top surface 311.

Extending legs 314 extends from the edge of the side wall 312 that is adjacent to the base 39, along a direction away from the side wall 312. That is, the extending legs 314 are bent relative to the side wall 312. The ends of the extending legs 314 near the side wall 312 are spaced form the adhesive injection openings 315. In other embodiments, there is only one extension leg 314.

The base 39 includes a substrate 391. The casing 31 is engaged with the substrate 391. In one embodiment, the edges of the base 39 further defines a plurality of receiving grooves 393. The extending legs 314 are received in the receiving grooves 393. The size of the receiving groove 393 is not less than the size of the extension leg 314. In other embodiments, the base 39 may further includes a plurality of through holes (not shown) penetrating through the substrate 391, and the size of the through holes is larger than the size of the extending legs 314 thus the extending legs 314 can pass through the through holes. The number of the extending legs 314 is equal to the number of the through holes. The extending legs 314 are bent towards the substrate 391 through the through holes and are received in the receiving grooves 393. The number of the through holes may be one or zero. The base 39 further includes a reinforcing layer 396. The reinforcing layer 396 is disposed on a side of the substrate 391 away from the top surface 311. The reinforcing layer 396 covers the surface of the extending leg 314 away from the substrate 391. The reinforcing layer 396 is fastened to the substrate 391.

The casing 31 and the base 39 can be bonded to each other by adhesive injected adhesive into the adhesive injection openings 315. The extending legs 314 and the substrate 391 can be bonded to each other by injecting adhesive into the receiving grooves 393. So, the casing 31 and the base 39 are bonded by injecting adhesive into the adhesive injection openings 315 and the receiving grooves 393. The adhesive injection openings 315 and the receiving grooves 393 are located at different positions, thus can provide stronger adhesion in different directions to the casing 31 and the base 39. Thus, the bonding strength between the casing 31 and the base 39 can be stronger.

Figure 8:
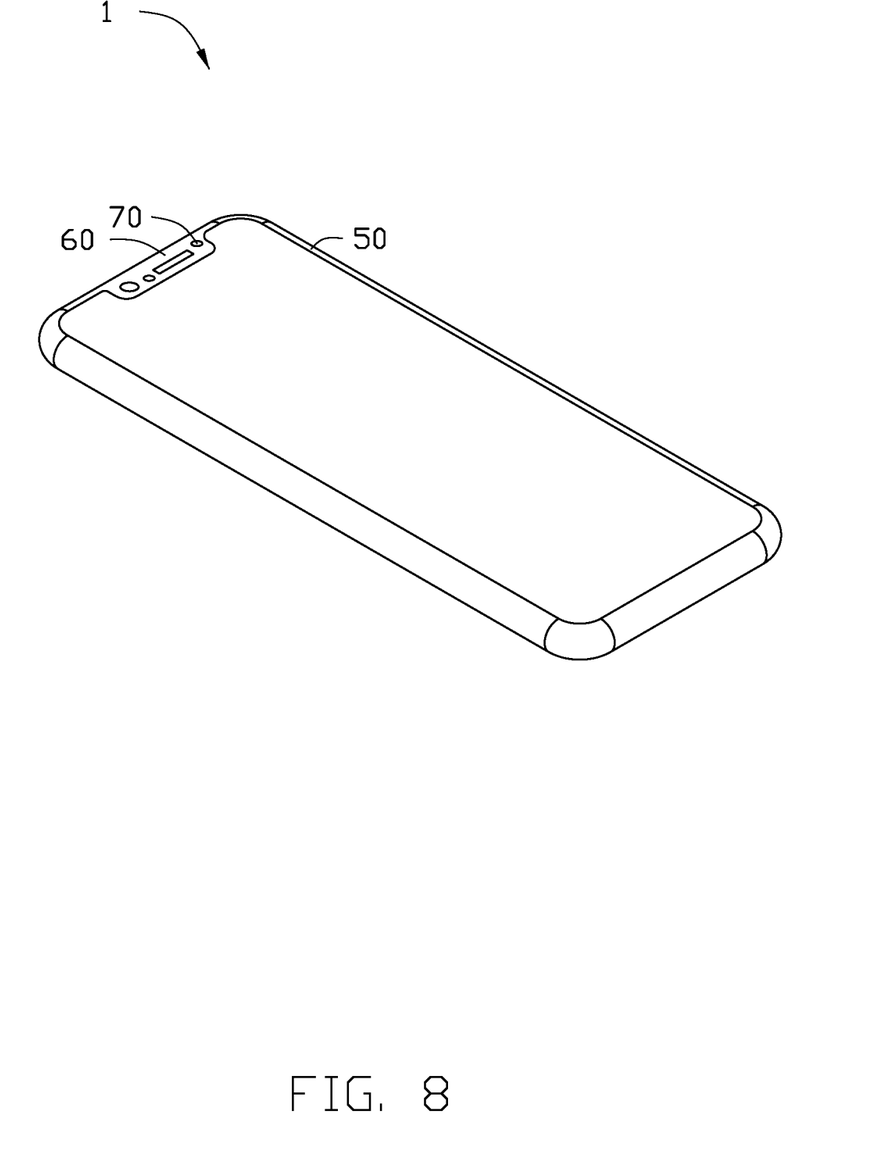
FIG. 8 is a perspective view of an electronic device including the voice coil motor according to the embodiments disclosed herein.

An electronic device 1 includes a casing 50 and a camera module 60 disposed in the casing 50. The camera module 60 further includes a voice coil motor 70. The voice coil motor 70 can be any voice coil motor of the first, second, or third embodiments. With reference to FIG. 8, the electronic device 1 is a mobile phone. In other embodiments, the electronic device 10 may also be a personal computer, a smart home appliance, an industrial controller, or the like. When the electronic device 10 is a mobile phone, the voice coil motor 70 can be a front camera and a face recognition unit.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising:
a voice coil motor, the voice coil motor comprising:
a base; and
a casing engaged with the base;
wherein the casing comprises a top surface and at least one side wall surrounding the top surface, the side wall is connected to the base, at least one extending leg extends from an edge of the side wall facing the base, and further extends along a direction facing away from the side wall;
a plurality of latching portions are disposed at an end of each of the extending leg away from the side wall, a plurality of grooves is defined at a side of the base away from the top surface, the extension leg is bent towards the base and in contact with the base, and each of the latching portion is engaged with the corresponding one of the groove.

2. The camera module of claim 1, wherein edges of the base defines at least one receiving groove, each of the extending leg is received in a corresponding one of the receiving groove.

3. The camera module according to claim 1, wherein the voice coil motor further comprises a reinforcing layer, the reinforcing layer is disposed at a side of the base away from the top surface, and the extending leg is disposed between the reinforcement layer and the base.

4. The electronic device of claim 3, wherein the reinforcing layer is engaged with the base.

5. The electronic device according to claim 1, wherein the edges of the base further defines a plurality of slots, the latching portion is disposed at an end of the extending leg near to the slot, the slot is engaged with the latching portion.

6. The electronic device according to claim 1, wherein a size of the receiving groove is not less than a size of the corresponding one of the extension leg.

7. The electronic device according to claim 1, wherein the edge of the side wall further defines a plurality of adhesive injection openings, and at least a portion of the adhesive injection openings is in contact with the base.

8. The electronic device according to claim 1, wherein the adhesive injection openings are spaced apart from the extending leg.

9. An electronic device comprising:
a body; and
a voice coil motor disposed in the casing, the voice coil motor comprising:
a base; and
a casing engaged with the base;
wherein the casing comprises a top surface and at least one side wall surrounding the top surface, the side wall is connected to the base, at least one extending leg extends from an edge of the side wall facing the base, and further extends along a direction facing away from the side wall;
a plurality of latching portions are disposed at an end of each of the extending leg away from the side wall, a plurality of grooves is defined at a side of the base away from the top surface, the extension leg is bent towards the base and in contact with the base, and each of the latching portion is engaged with the corresponding one of the groove.

10. The electronic device of claim 9, wherein edges of the base defines at least one receiving groove, each of the extending leg is received in a corresponding one of the receiving groove.

11. The electronic device according to claim 9, wherein the voice coil motor further comprises a reinforcing layer, the reinforcing layer is disposed at a side of the base away from the top surface, and the extending leg is disposed between the reinforcement layer and the base.

12. The electronic device of claim 11, wherein the reinforcing layer is engaged with the base.

13. The electronic device according to claim 9, wherein a size of the receiving groove is not less than a size of the corresponding one of the extension leg.

14. The electronic device according to claim 9, wherein the edge of the side wall further defines a plurality of adhesive injection openings, and at least a portion of the adhesive injection openings is in contact with the base.

15. The electronic device according to claim 14, wherein the adhesive injection openings are spaced apart from the extending leg.

16. The electronic device according to claim 9, wherein the edges of the base further defines a plurality of slots, the latching portion is disposed at an end of the extending leg near to the slot, the slot is engaged with the latching portion.

\* \* \* \* \*